US008649794B2

(12) United States Patent
Gustavsson et al.

(10) Patent No.: US 8,649,794 B2
(45) Date of Patent: Feb. 11, 2014

(54) METHODS AND APPARATUS FOR TRANSCEIVER ALLOCATION IN MOBILE COMMUNICATION NETWORKS

(75) Inventors: Pär Gustavsson, Linköping (SE); Dan Antonsson, Vikingstad (SE); Bo Ehrenholm, Linköping (SE); Sofia Svedevall, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 330 days.

(21) Appl. No.: 13/226,947

(22) Filed: Sep. 7, 2011

(65) Prior Publication Data

US 2012/0064905 A1 Mar. 15, 2012

Related U.S. Application Data

(60) Provisional application No. 61/380,837, filed on Sep. 8, 2010.

(51) Int. Cl.
*H04W 72/00* (2009.01)

(52) U.S. Cl.
USPC .......................................... 455/450

(58) Field of Classification Search
USPC .......................................... 455/450
See application file for complete search history.

(56) References Cited

U.S. PATENT DOCUMENTS

| | | | |
|---|---|---|---|
| 7,236,784 B2 | 6/2007 | Johannesson et al. | |
| 2006/0233136 A1 | 10/2006 | Noh et al. | |
| 2006/0291427 A1 | 12/2006 | Park | |
| 2007/0171861 A1 | 7/2007 | Akhtar | |
| 2008/0192697 A1 | 8/2008 | Shaheen | |
| 2010/0015926 A1* | 1/2010 | Luff ........................... | 455/67.13 |
| 2010/0330996 A1 | 12/2010 | Svedevall et al. | |
| 2011/0125833 A1 | 5/2011 | Persson | |
| 2012/0155576 A1 | 6/2012 | Jonsson | |

FOREIGN PATENT DOCUMENTS

| | | |
|---|---|---|
| WO | 9717816 A1 | 5/1997 |
| WO | 2007036780 A1 | 4/2007 |

OTHER PUBLICATIONS

PCT International Search Report, mailed Nov. 24, 2008, in connection with International Application No. PCT/SE2008/050185.
3GPP TS 25.331, V8.11.0 Technical Specification Group Radio Access Network; Radio Resource Control (RRC); Protocol Specification (Release 8), Jun. 2010.
3GPP TS 44.018, V8.11.0 Technical Specification Group GSM/EDGE Radio Access Network; Mobile radio interface layer 3 specification; Radio Resource Control (RRC) protocol (Release 8), Jun. 2010.

* cited by examiner

*Primary Examiner* — Temica M Beamer
*Assistant Examiner* — Joel Ajayi
(74) *Attorney, Agent, or Firm* — Potomac Patent Group PLLC

(57) ABSTRACT

Methods and apparatus in a base station controller (BSC) or equivalent node for sharing a pool of radio transceivers are described. The BSC belongs to a first wireless telecommunication network, the pool of radio transceivers includes first radio transceivers for a first radio base station (RBS) belonging to the first wireless telecommunication network and second radio transceivers for a second RBS belonging to a second wireless telecommunication network, and the first and second radio transceivers have substantially the same geographic coverage. A method includes selecting a radio transceiver from the pool irrespective of whether the radio transceiver selected is a first radio transceiver or a second radio transceiver; and allocating a communication channel provided by the selected radio transceiver to a respective mobile station registered in at most one of the first and second telecommunication networks.

21 Claims, 4 Drawing Sheets

METHODS AND APPARATUS FOR TRANSCEIVER ALLOCATION IN MOBILE COMMUNICATION NETWORKS

This application claims the benefit of the filing date of U.S. Provisional Patent Application No. 61/380,837 that was filed on Sep. 8, 2010, and that is incorporated here by reference.

TECHNICAL FIELD

This invention generally relates to allocation of resources in mobile communication networks, and more particularly to receiving and transmitting nodes in such networks.

BACKGROUND

Sharing radio network hardware enables network operators to share the usually heavy deployment costs of cellular radio communication networks. It is possible today to share much of the Base Station System (BSS) hardware of a GSM network, including Base Station Controllers (BSCs), physical base station sites, Radio Base Stations (RBSs), RBS antennas, etc. Thus, a BSC and an RBS can be configured to support multiple cells that belong to different operators, or Public Land Mobile Networks (PLMNs), which are identified by different Mobile Network Codes (MNCs).

Each RBS in a BSS shared by different PLMNs broadcasts a respective one of the different MNCs, and so only mobile stations (MSs) registered in an operator's core network (and MSs from roaming partners of the operator) can access that operator's RBS. It may be noted that an MS's Home PLMN is the PLMN where the Mobile Country Code (MCC) and MNC of the PLMN identity are the same as the MCC and MNC of the MS's International Mobile Subscriber Identity (IMSI)

Hardware sharing is limited today. For example, the specific RBS hardware related to a cell, i.e., the radio transceiver (TRX), must be dedicated to a respective cell in a respective PLMN, and so TRXs cannot be shared. This is disadvantageous because although it is possible to share BSS hardware other than the RBS TRXs, the TRXs are a significant fraction of the total cost of an RBS. By not sharing TRXs, it is also not possible to even out the traffic loads between sharing PLMNs at busy times, and so each PLMN has to dimension its TRXs and RBSs for its own traffic peaks.

U.S. Patent Application Publication No. US 2010/0330996 A1 by Svedevall et al. (Dec. 30, 2010) describes a control node that enables operators to share BSS hardware by handing over an on-going MS connection between PLMNs of BSS-sharing operators. This is sometimes called inter-PLMN handover, and involves handing over an MS's circuit-switched (CS) connection from a cell, or RBS, belonging to a first operator to a cell, or RBS, belonging to a second operator, while the MS remains connected to the first operator's GSM core network. Also, a packet-switched (PS) connection can be handed over to a cell belonging to the second operator, while remaining connected to the first operator's General Packet Radio System (GPRS) core network. Although inter-PLMN handover can provide load sharing between cells from different PLMNs, it can be said that it does not effectively provide TRX sharing.

SUMMARY

Objects of this invention include solving the problems with current sharing techniques, such as those described above, and improving resource allocation in a cellular radio communication network, for example by treating transceiver hardware as a shared resource. Embodiments of this invention can be particularly useful in scenarios where two or more network operators share the hardware of a base station system, including physical base station sites, radio base station transceivers, antennas, A-bis-interface transmissions, etc.

In accordance with aspects of this invention, there is provided a method in a base station controller (BSC) of allocating a radio channel resource to a mobile station from channel resources provided by a pool of radio transceivers shared among a plurality of wireless telecommunication networks. The BSC belongs to a first network of the plurality of wireless telecommunication networks, the pool includes first radio transceivers for a first radio base station belonging to the first network and second radio transceivers for a second radio base station belonging to a second network of the plurality of telecommunication networks, and the first and second radio transceivers have substantially the same geographic coverage. The method includes configuring the BSC to be aware of twin cells provided by respective first and second radio transceivers, the twin cells having the same geographic area; determining whether a request for a channel resource is directed to a cell that has a respective twin cell; and if the request for the channel resource is directed to a cell that has a configured twin cell, allocating a channel resource from either the cell or the respective twin cells irrespective of wireless communication network to which the allocated cell belongs, and storing a registered network of the mobile station.

Also in accordance with aspects of this invention, there is provided an apparatus in a base station controller for allocating a radio channel resource to a mobile station from channel resources provided by a pool of radio transceivers shared among a plurality of wireless telecommunication networks. The base station controller belongs to a first network of the plurality of wireless telecommunication networks; the pool includes first radio transceivers for a first radio base station belonging to the first network and second radio transceivers for a second radio base station belonging to a second network of the plurality of telecommunication networks; and the first and second radio transceivers have substantially the same geographic coverage. The apparatus includes an electronic processor configured to be aware of twin cells provided by respective first and second radio transceivers, the twin cells having substantially the same geographic coverage area; to determine whether a request for a channel resource is directed to a cell that has a respective twin cell; and to allocate, if the request for the channel resource is directed to a cell that has a configured twin cell, a channel resource from either the cell or the respective twin cells irrespective of wireless communication network to which the allocated cell belongs; and a memory configured for storing a registered network of the mobile station.

Also in accordance with aspects of this invention, there is provided a computer-readable medium having stored instructions that, when executed by a computer, cause the computer to carry out a method in a base station controller of allocating a radio channel resource to a mobile station from channel resources provided by a pool of radio transceivers shared among a plurality of wireless telecommunication networks. The base station controller belongs to a first network of the plurality of wireless telecommunication networks; the pool includes first radio transceivers for a first radio base station belonging to the first network and second radio transceivers for a second radio base station belonging to a second network of the plurality of telecommunication networks; and the first and second radio transceivers have substantially the same geographic coverage. The method includes configuring the base station controller to be aware of twin cells provided by respective first and second radio transceivers, the twin cells having the same geographic area; determining whether a request for a channel resource is directed to a cell that has a respective twin cell; and if the request for the channel resource is directed to a cell that has a configured twin cell, allocating a channel resource from either the cell or the respective twin cells irrespective of wireless communication network to which the allocated cell belongs, and storing a registered network of the mobile station.

BRIEF DESCRIPTION OF THE DRAWINGS

The several features, objects, and advantages of this invention will become apparent by reading this description in conjunction with the drawings, in which.

DETAILED DESCRIPTION

According to the present invention, more parameters are analyzed and taken into account than in conventional systems when deciding if sharing between cells of different PLMNs takes place or not. One of the advantages of embodiments of the present invention over prior devices and methods is that fulfillment of service requirements is considered when deciding whether a channel resource will be allocated from a home PLMN (HPLMN) or shared from another PLMN. Depending on consumer preferences, other criteria can also be used in deciding whether a channel resource will be allocated in the HPLMN or another PLMN as described below.

Figure 1:
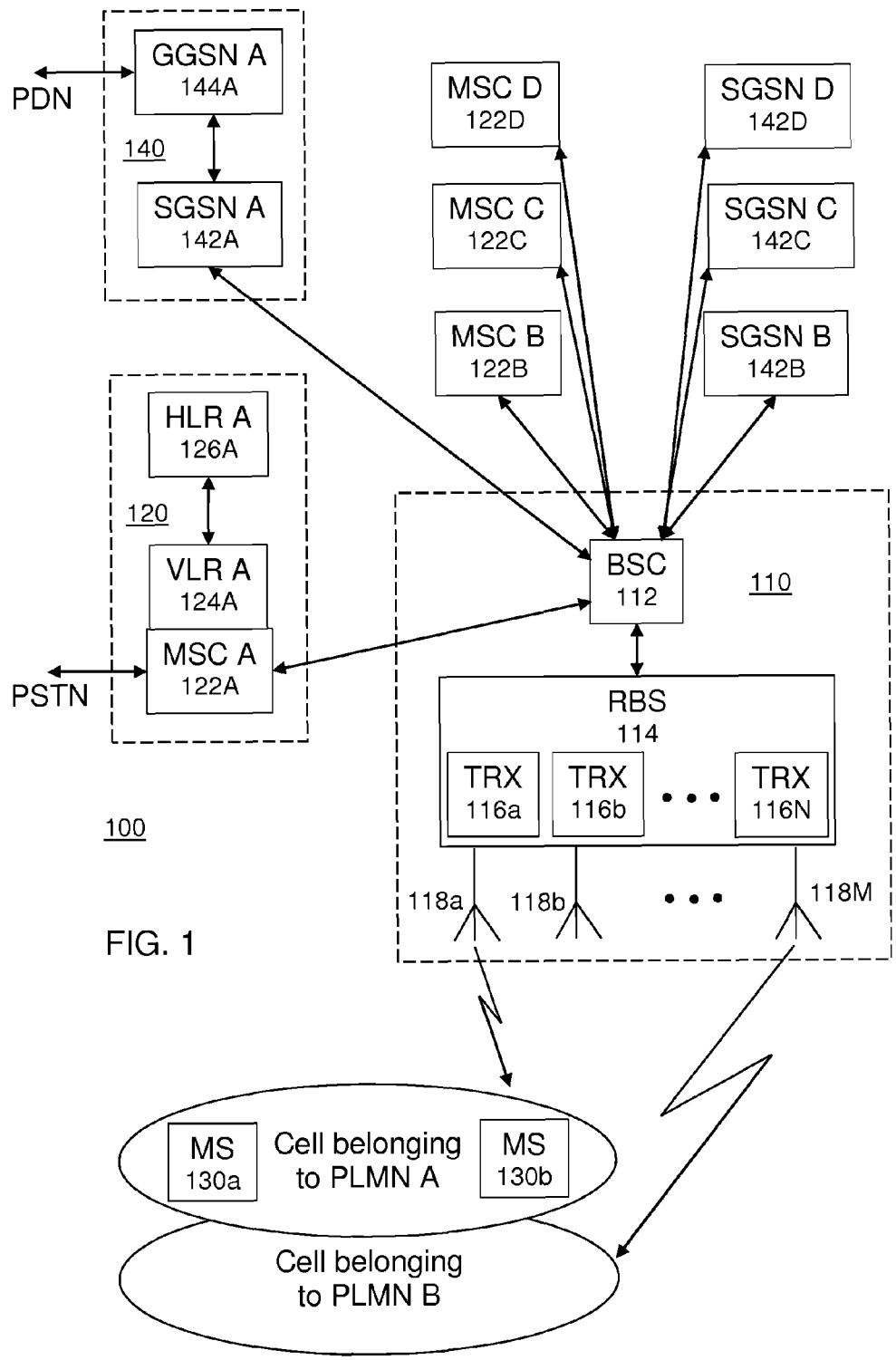
FIG. 1 depicts an example of a cellular radio communication network with a shared base station system.

FIG. 1 depicts a GSM cellular radio network 100 that includes a shared BSS 110, a Network and Switching Subsystem (NSS) 120, and MSs 130a, 130b, which can be mobile telephones or any other devices that communicate via cellular radio. It will be appreciated that the network (NW) 100 can include more than two MSs 130 and more than one BSS 110. The network 100 can also include other parts, such as a General Packet Radio System (GPRS) core network 140, as depicted in FIG. 1.

It should be understood that although this description and FIG. 1 are in terms of GSM networks, this invention is not limited to GSM networks but can be implemented in Wideband Code Division Multiple Access (WCDMA) and other suitable networks. GSM and WCDMA networks, which can also be called Universal Terrestrial Radio Access Networks (UTRANs), are defined by specifications set forth by the Third Generation Partnership Project. It will be noted that GSM networks and UTRANs use somewhat different terminology for the same functionality. For example in a UTRAN, the BSC 112 is called a Radio Network Controller, the RBS 114 is called a NodeB, and the MSs 130 are called User Equipments (UEs). Moreover, the functionalities of the entities depicted in FIG. 1 can be combined and distributed among entities in a network in different ways.

The BSS 110 is responsible for handling traffic and signaling between the MSs 130a, 130b and the NSS 120 and GPRS core network 140. For example, the BSS 110 transcodes speech channels, allocates radio channels to and pages the MSs 130a, 130b, and manages the quality of transmission and reception over air interfaces between the RBS 114 and the MSs 130a, 130b. As depicted in FIG. 1, the BSS 110 includes a BSC 112 and an RBS 114, but it will be appreciated that the BSS 110 can include more than one BSC and more than one RBS, with each BSC arranged to control a respective set of RBSs. The RBS 114 is typically located at a physical location, or cell site, that is remote from its controlling BSC 112, and the BSC 112 and RBS 114 are typically coupled by a connection that is called the Abis-interface over dedicated telephone lines, optical fiber links, microwave links, etc.

The NSS 120, which is sometimes called the GSM core network, carries out switching functions and manages CS communications between the MSs 130a, 130b and a Public Switched Telephone Network (PSTN) or other network (not shown). The NSS 120 is deployed by an operator of the network 100, call it operator A, and typically includes a Mobile Services Switching Center (MSC) 122A coupled to a Visitor Location Register (VLR) 124A and a Home Location Register (HLR) 126A. The VLR and HLR retain information relating to network subscribers and visitors, i.e., the MSs 130. The MSC 122A is coupled to the BSC 112 of the BSS 110 by a connection that is called the A-interface.

The GPRS core network 140 handles data packet switching functions and manages PS communications between the MSs 130a, 130b and a Public Data Network (PDN), such as the internet or other network (not shown). The GPRS core network 140 can also be deployed by network operator A, and typically includes one or more Serving GPRS Support Nodes (SGSNs) 142A that communicates with a Gateway GPRS Support Node (GGSN) 144A. It will be understood that the GPRS core network 140 can include more than one SGSN and more than one GGSN, as well as other nodes for other functions. The SGSN 142A is coupled to the BSC 112 of the BSS 110 by a connection that is called the Gb-interface.

As depicted in FIG. 1, the RBS 114 includes a pool of TRXs 116a, 116b, . . . , 116N that provide communication signals through one or more antennas 118a, 118b, . . . , 118N to one or more cells, or geographic areas, in the network 100. In a conventional GSM network, a TRX belonging to the operator A, e.g., TRX 116a, would transmit broadcast control channel (BCCH) signals through an antenna, e.g., antenna 118a, that include the MNC of the operator A, and so those BCCH signals would identify the corresponding cell as belonging to the operator A's network, which will be called PLMN A. It will be appreciated that the BSC 112 can control more than one RBS 114, and so the pool of TRXs can include one or more TRXs in one or more other RBSs, which are not shown in FIG. 1 for clarity.

In this application, it is assumed that a plurality of network operators share the BSC 112 and RBS 114 to provide respective separate logical radio networks with their own cells identified with their own PLMN identity, e.g., MNC. Thus, one or more of the TRXs 116a, 116b, . . . , 116N belong to an operator A and transmit a BCCH A that effectively identifies a geographic area, or cell, as belonging to operator A, and at least another one or more of the TRXs 116a, 116b, . . . , 116N belong to an operator B and transmit a BCCH B that effectively identifies a cell as belonging to operator B. In FIG. 1, the network of operator B is illustrated by the BSS 110 and an MSC B 122B and an SGSN B 142B, and it will be appreciated that the arrangement of operator B's network can be substantially the same as the arrangement of operator A's network described above.

FIG. 1 also illustrates that other network operators can also share the BSS 110, showing a network of an operator C illustrated by the BSS 110 and an MSC C 122C and an SGSN C 142C, and a network of an operator D illustrated by the BSS 110 and an MSC D 122D and an SGSN D 142D. As with the network of operator B, it will be appreciated that the arrangements of operator C's and D's networks can be substantially the same as the arrangement of operator A's network.

Since the base station sites and antennas are shared, it is also assumed that the respective logical radio networks have radio coverages that are the same or nearly so. Thus, one or more cells in one operator's radio network can be considered as having one or more corresponding "twin" cells in the other operator's radio network with the same or substantially the same radio coverage. In this application, twin cells are two cells from different PLMNs (e.g., that transmit different BCCHs) that have the same or substantially the same radio coverage. Two such cells are depicted in FIG. 1, for operator A and operator B. It is also assumed that each operator has its own core network. An advantage of embodiments of this invention is that they have little or no impact on core network functionality and require no additional functionality in MSs.

TRX resource sharing is advantageously achieved by treating the traffic channels (TCHs) of a pair of twin cells as a common pool of TCHs. When a subscriber (MS) from one of the respective PLMNs sets up a speech call, the needed TCH resource is allocated from the TCH pool that includes the cell in which the call is set up and that cell's twin cell. The same procedure is also applied when allocating TCHs during call handovers.

It will be understood that any TRX resource, not just TCHs, can be shared and dedicated to a respective MS. For example, Stand Alone Dedicated Control Channels (SDCCHs) are used for dedicated signaling purposes related to specific MSs. TRX resource sharing is achieved by treating the SDCCHs of a pair of twin cells as a common pool of SDCCHs. Another example involves packet data traffic. When a Temporary Block Flow (TBF) needs to be allocated in relation to the start of a packet data session, Packet Data Channel (PDCH) resources need to be allocated for the TBF. In accordance with aspects of this invention, the conventional TBF to PDCH resource allocation algorithm is modified to take account of not only the PDCHs of the current serving cell but also the PDCHs of the twin cell.

With prior art methods and devices, it is possible to share much of the resources of a BSS among different logical radio networks, such as BSC hardware, base station sites, antennas, etc. Nevertheless, it is not possible to share the TRXs in an RBS because the TRXs are conventionally predefined for each cell and network. Embodiments of this invention include methods of sharing TRX resources between logical radio networks that can be implemented in a shared BSS network. An advantage of embodiments of this invention is that they are expected to have minimal impact on existing networks implemented using prior art BSS sharing.

As described above, the TRXs in an RBS implement the network side of uplink and downlink radio frequency carriers in a wireless telecommunication network, such as a GSM, WCDMA, or other system. For a GSM system, a TRX includes a transmitter for a downlink radio-frequency carrier that is temporally divided into successive frames of eight time slots each and a receiver for corresponding uplink signals from MSs. A TRX implements a variety of logical channels according to the particular communication network that are mapped on the TRX's radio interface, such as a BCCH, Common Control Channel (CCCH), SDCCHs, PDCHs, and TCHs. The different logical channels can be divided into two general categories: traffic channels, which are allocated by the BSC and RBS to respective users for different types of user traffic, such as speech and packet data; and control, or signaling, channels, which can be further divided into broadcast, common, and dedicated control channels.

The inventors have recognized that most of the hardware of a TRX is typically used to implement TCHs and PDCHs, which are assigned to particular MSs, with the ratio of TCHs to PDCHs depending on the amounts of speech traffic and packet data traffic handled by a TRX at any one time. Thus, the inventors have further recognized the importance of sharing a TRX's TCH resources among communication networks since speech is often the traffic type that occupies most of the TRX hardware. In addition to sharing TRX TCH resources for speech, the inventors have recognized the importance of an ability to share TRX resources for PDCHs, as well as for dedicated signaling channels, such as SDCCHs.

Allocation of TCHs for CS Services

At setup of a speech call in a GSM communication network, the BSC 112 allocates a TCH (which can be either a full-rate or a half-rate TCH) for communication between the RBS 114 and the respective MS. During the call, one or more new TCHs can be allocated as the MS moves between cells in the network in a process called handover. Even if the MS stays within one cell during a call, the MS can be assigned a new full-rate or half-rate TCH in the interest of channel optimization or other network features. It will be appreciated that equivalent actions are carried out in other types of communication network.

Conventionally allocated TCHs, and so allocated TRXs, are always selected from TCHs in cells in the PLMN in which an MS, or subscriber, is registered. A registered PLMN (RPLMN) usually is the station's HPLMN, or the PLMN of a roaming partner of the HPLMN. Even when a BSS is conventionally shared among a number of PLMNs, the BSC for a specific MS always allocates TCHs from the station's RPLMN and thereby from the TRXs allocated to cells of the HPLMN or a roaming partner of it. In other words, the conventional radio channel resource allocation algorithm executed by a BSC always searches for TRX resources in cells from the HPLMN or a roaming partner of it.

In contrast to conventional TCH allocation, embodiments of this invention can share TCHs (in other words, TRX resources) in cells belonging to all PLMNs that share a BSS. Thus, in accordance with aspects of this invention, a modified radio channel resource allocation algorithm is provided in a BSC for CS speech traffic. A suitable modified algorithm searches for TRX resources in cells belonging not only to an MS's RPLMN but also in one or more other PLMNs that are known to share the BSS, preferably with the RPLMN and other PLMNs having similar configurations, e.g., cells having similar BCCH frequencies using the same antenna(s), and cells having similar geographic coverages. It will be understood that network operators can agree to share a BSS in many different ways, e.g., operator A and operator B can agree to share all or only some TRXs in an RBS equally or unequally.

Figure 2:
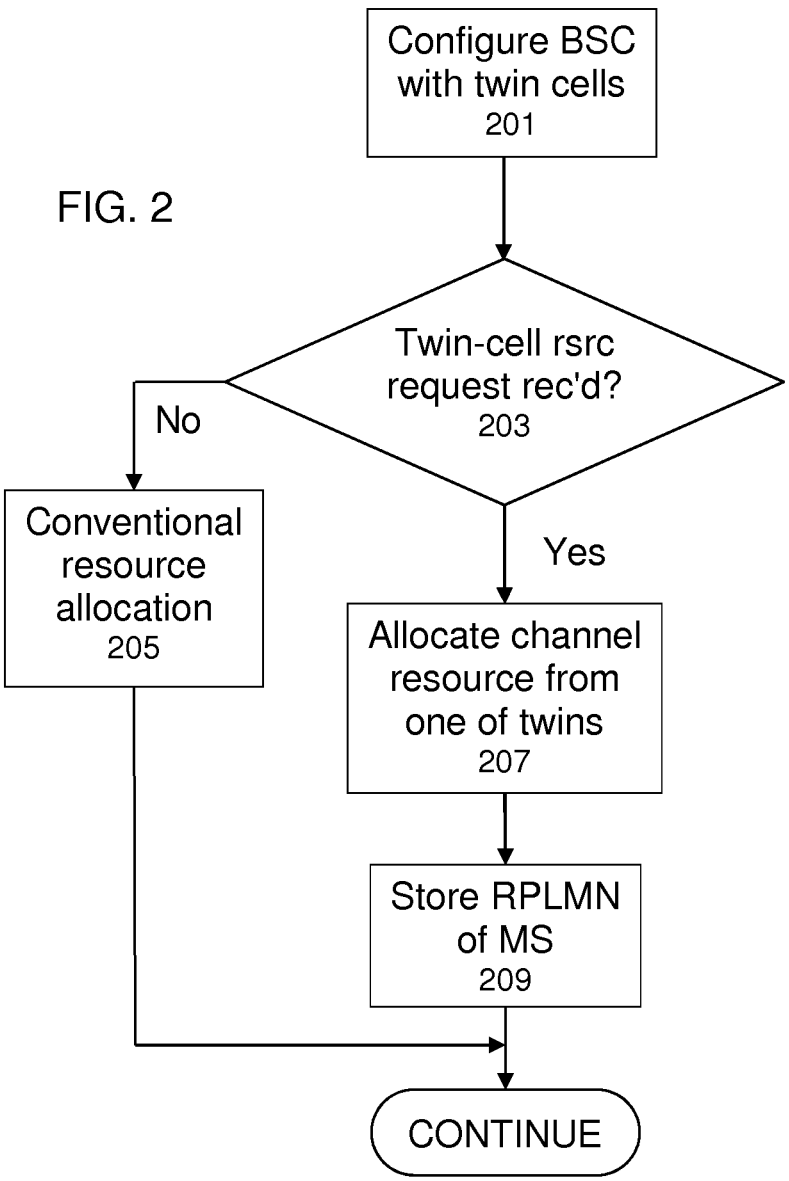
FIG. 2 is a flowchart of an improved channel resource allocation method.

FIG. 2 is a flowchart that illustrates a channel resource allocation method in a BSC in accordance with aspects of this invention. As described above, at setup of a speech call, an MS from a PLMN A normally is allocated a channel resource from a TRX corresponding to a cell in the PLMN A, but with the inventors' modified channel resource allocation algorithm, a PLMN A MS can be allocated a channel resource from a TRX corresponding to a twin cell in a PLMN B. The following description of the method uses two PLMNs as an example, but it will be appreciated that more than two PLMNs can be used.

In step 201, a BSC 112 is configured such that the BSC is aware of which cells in PLMN A and PLMN B cover the same geographic areas, i.e., which cells are twin cells. The BSC can be configured by simply storing a list of twin cells in a suitable memory in the BSC. This is done for both BSC-internal and BSC-external twin cells. A BSC-internal cell is a cell that the BSC is responsible for when it comes to resource allocation, etc. A BSC-external cell is a cell that is known to the BSC but for which another BSC is responsible for resource allocation, etc. A BSC has full responsibility for its own BSC-internal cells, and at the same time is aware of cells that are neighbors to its own BSC-internal cells (i.e., BSC-external cells). A cell that is a BSC-internal cell in one BSC can of course be a BSC-external cell in another BSC.

As an alternative to storing a predetermined configuration, the BSC can configure itself by searching for cells in PLMN A and PLMN B that use the same RBS antenna and the same BCCH configuration, thereby determining which cells are twin cells that belong together. Cells that use the same BCCH configuration are cells that have the same or substantially the same geographic coverage. One may expect such cells to use different frequencies for their BCCHs as the cells can belong to different PLMNs.

In step 203, the BSC checks whether an incoming request for a channel resource is directed to a cell that has a configured twin cell. Such a request can arise in several ways, e.g., as the result of a call placed from an MS or of a handover of a call from another RBS or of a handover of a call within an RBS. If a twin cell does not exist (No in step 203), conventional resource allocation is carried out (step 205) according to the particular requirements of the PLMN. In a GSM network for example, Section 3.3 of Third Generation Partnership Project (3GPP) Technical Specification (TS) 44.018 V8.11.0, Radio Resource Control (RRC) Protocol (Release 8) ((June 2010) specifies radio resource connection establishment procedures. In a WCDMA network, comparable RRC connection establishment procedures can be found in Section 8.1.3 of 3GPP TS 25.331 V8.11.0, Radio Resource Control (RRC); Protocol Specification (Release 8) (June 2010).

If a twin cell does exist for the incoming request (Yes in step 203), a channel resource, i.e., a TCH (and so a TRX), is allocated (step 207) from one of the two twin cells that best matches the service requirements (e.g., half-rate or full-rate TCH) received from the MSC in connection with the incoming request. The twin cell that has a PLMN identity corresponding to the PLMN of the cell in which the MS made the originating access is here denoted an RPLMN cell. If the RPLMN cell and the twin cell from another PLMN can provide the same type of channel resource, the inventors currently prefer that the BSC preferentially allocates a channel resource from the RPLMN cell in step 207. A channel resource from the other-PLMN twin cell is allocated if that channel resource is a better match to the requested service requirements or if the RPLMN cell has run out of channel resources.

As an alternative in allocating a channel resource when twin cells exist (step 207), a BSC can choose a channel resource from the cell that best matches the service requirements requested, and if both cells equally match the service requirements, the BSC can allocate a resource from the cell having the lower traffic load. Another alternative is the BSC can allocate a channel resource based on the MS's priority as well as the service requirements requested, the cell load, and the MS's RPLMN. For example, a low-priority MS could be assigned a half-rate channel more often than a high-priority MS.

A channel allocation algorithm such as that depicted by FIG. 2 requires the BSC to keep track, for each MS context, of the RPLMN of the respective MS. This can be done in the BSC by storing (step 209), for each MS context, information identifying the respective RPLMN (e.g., at least the MNC of the respective PLMN). As described above, the RPLMN is preferably set to the PLMN of the cell in which the MS's first access was made, or in the case of an incoming inter-BSC handover, the RPLMN can be set either to the PLMN corresponding to the MSC initiating the handover or to the PLMN of the indicated handover target cell.

The BSC executes a channel resource allocation algorithm such as that depicted by FIG. 2 both at call setup and at channel allocation related to handovers triggered due to mobility reasons. Handover is described in more detail below.

It will be appreciated that the BSC's knowledge of which cells are twin cells can be used to improve resource utilization of the combination of twin cells, e.g., dynamic half-rate/full-rate speech codec allocation/adaptation, which are features that dynamically trigger allocation of half-rate and full-rate speech codecs, depending on the load in a cell. It should be understood that TRXs in an RBS can include speech codecs, which can be assignable resources in an RBS, although speech codecs can instead be placed either in the BSC or in a node of the circuit-switched core network. These features can also trigger intra-cell handovers with the goal of placing half-rate speech calls on half-rate channels in an efficient way, e.g., packing half-rate calls together on half-rate channels carried in the same time slots, and taking the loads of both twin cells into account in packing half-rate calls.

It will also be appreciated that when a BSC completes a radio channel resource allocation as described above, a new handover evaluation process needs to be started for the newly allocated traffic channel. Such a handover evaluation process typically includes evaluating received-signal measurement reports from the MS and the RBS and determining handover candidates, e.g., neighbor cells of the cell in which the new channel was allocated.

Figure 3:
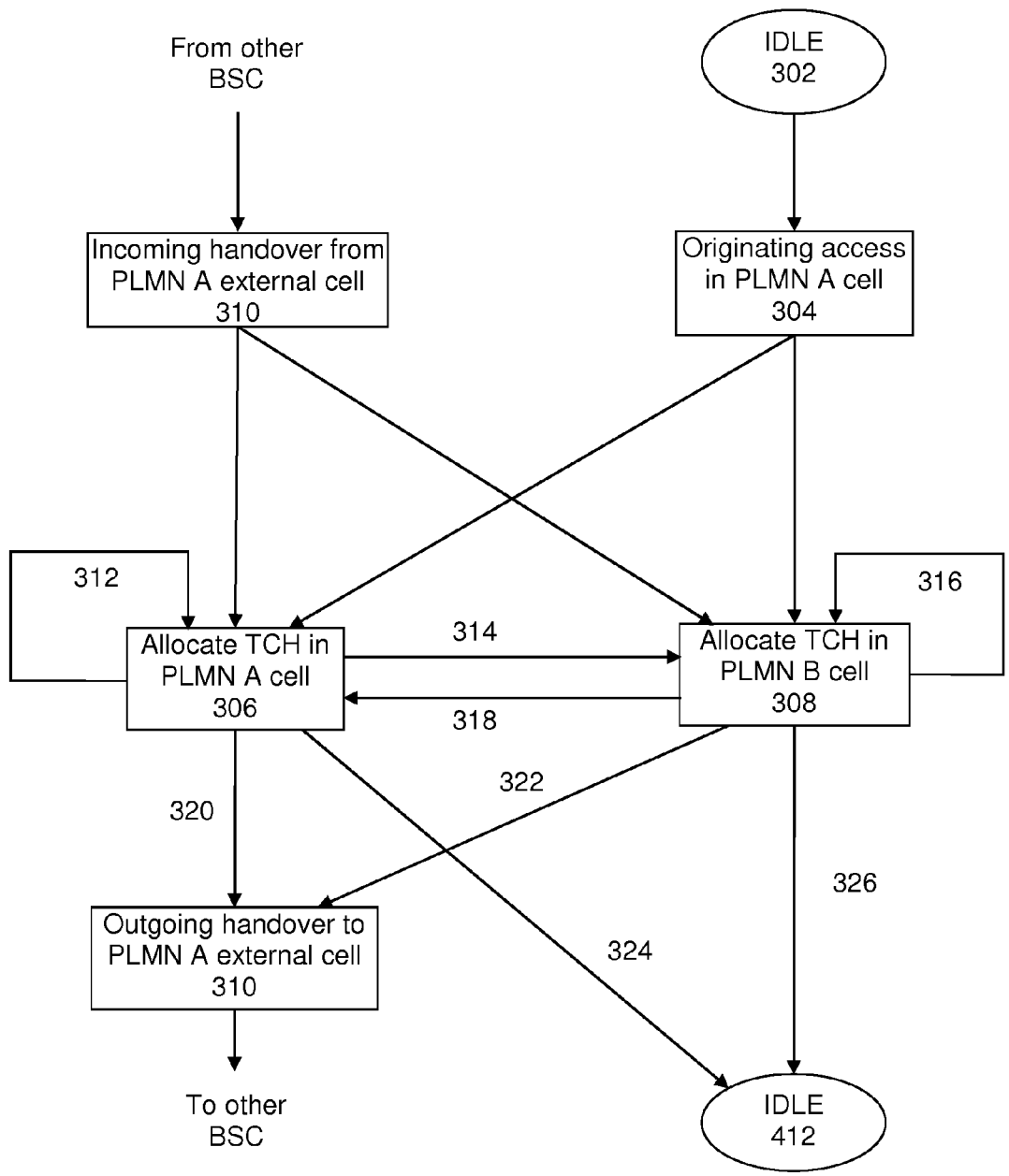
FIG. 3 is a flowchart illustrating channel resource allocation with a pool of radio transceivers.

FIG. 3 is a chart of an example of the logic implemented by a BSC that illustrates how a MS registered in a PLMN A can access a cell for a speech call, with TCHs allocated from cells of its own PLMN A and from twin cells of another PLMN B during the call. It will be noted that the TCH sharing includes channel allocation at call setup as well as channel allocation due to subsequent handovers. Handover to an external BSC, i.e., a BSC that does not participate in TRX sharing, is done using cells of PLMN A. It will be appreciated that the BSC would behave equivalently for a MS registered in a PLMN B, with TCHs allocated from cells of the MS's own PLMN B and from twin cells of PLMN A.

While in an IDLE state 302, the MS occasionally and conventionally makes received-signal measurements of cells of its RPLMN, which in this example is PLMN A. The MS sends an access message to an RBS of the PLMN A, originating a call (step 304). Based on the received access message, the BSC corresponding to the RBS in PLMN A connects the originating MS to the MSC that belongs to the RPLMN, i.e., MSC A, and allocates a TCH to the call as described above (e.g., step 207). The BSC allocates a TCH and other necessary TRX resources either in a cell of the PLMN A (step 306) or in a twin cell of another PLMN B (step 308) as described above.

Also as depicted in FIG. 3, a resource allocation request can arise as the result of a call handover from a cell in the PLMN A that does not belong to the BSC (step 310), or from another PLMN, for that matter. Such a cell in the PLMN A can be called a BSC-external cell. Just as occurs for a MS-originated access, the BSC in PLMN A allocates a TCH and other necessary TRX resources either in a cell of the PLMN A (step 306) or in a twin cell of another PLMN B (step 308) as described above.

From time to time while being served by a cell of the PLMN A, the MS measures received signals from cells in its active cell list, including neighboring cells in the PLMN A. Based on the measurements, the BSC can trigger a handover (step 312) that results in the BSC's allocating a TCH that is still from a cell belonging to the MS's home PLMN. Alternatively, a handover can be triggered (step 314) that results in the BSC's allocating a TCH that is from a twin cell belonging to the PLMN B.

In a similar way when the MS has been allocated a TCH in the PLMN B (step 308), the MS measures received signals from time to time from neighboring cells in the PLMN B in its active cell list. Based on the measurements, the BSC can trigger a handover (step 316) that results in the BSC's allocating a TCH that is still from a cell belonging to the PLMN B. Alternatively, a handover can be triggered (step 318) that results in the BSC's allocating a TCH that is from a twin cell belonging to the PLMN A.

While the MS is allocated a TCH in the PLMN A (step 306), the MS received-signal measurements of neighboring cells in the PLMN A can be used by the BSC as the basis for a handover (step 320) to a BSC-external cell in the PLMN A. Similarly, while the MS is allocated a TCH in the PLMN B (step 308), the MS received-signal measurements of neighboring cells in the PLMN B can be used by the BSC as the basis for a handover (step 322) to a BSC-external cell in the PLMN A.

When the call is released (step 324) while the MS is allocated a TCH in the PLMN A, the MS returns to its IDLE state, as it does when the call is released (step 326) while the MS is allocated a TCH in the PLMN B. It will be appreciated that upon call release, the MS performs cell search and cell selection in the registered PLMN A in the conventional way.

Allocation of PDCH Resources Related to a TBF

When a packet session is started, the BSC allocates channel resources for the TBF on PDCH channels. A suitable TBF resource allocation algorithm in a BSC is analogous to the speech traffic channel resource allocation algorithm described above in connection with FIG. 2, and takes into account the PDCH channels of a twin cell. The TBF channel resource allocation algorithm can be configured to prefer putting a TBF on the RPLMN cell of a pair of twin cells depending on criteria similar to those used for speech channels. For example, the BSC can choose the RPLMN cell as long as PDCH channel resources are available, and otherwise choose resources from the twin cell; and/or the BSC can choose the cell which is judged to provide the higher best-effort packet data throughput; and/or the BSC can choose the cell that best fulfills quality-of-service requirements received from the packet core network.

Allocation of SDCCH Resources for CS Services

Similarly, a suitable SDCCH resource allocation algorithm in a BSC is analogous to the speech traffic channel resource allocation algorithm described above in connection with FIG. 2, treating SDCCHs in an RPLMN cell and SDCCHs in a respective twin cell as a single pool of SDCCHs. The SDCCH resource allocation algorithm can be configured to choose an SDCCH from an RPLMN cell or a respective twin cell depending on criteria similar to those used for speech channels. For example, the BSC can choose the RPLMN cell as long as SDCCH channel resources are available, and otherwise chose an SDCCH resource from the twin cell; and/or the BSC can choose a cell depending on the traffic case and SDCCH load in the twin cells. Here, the SDCCH load refers to the amount of SDCCH channels that are left compared to the total amount of available SDCCH channels.

CS Core Network Transparency

It is advantageous for the resource sharing and twin cells described above to be "transparent" to an MSC and other core network nodes. With the MSC being unaware of the resource sharing and twin cells, their impact on the CS core network is minimal.

Assume for example a BSS shared between a PLMN A and a PLMN B and an MS belonging to PLMN A that has been assigned a channel resource in a PLMN B twin cell. In order for the sharing to be transparent, the identity of the twin cell that is sent to the MSC in PLMN A is the identity of the respective twin PLMN A cell.

This requires new functionality in the BSC at sending of the A-interface Assignment Complete and A-interface Handover Performed messages in a GSM network and equivalent messages in other networks. When a BSC has successfully allocated a channel resource to the MS during call setup (via the Assignment Procedure) or during intra-BSC inter-cell handover, the corresponding MSC is informed about the cell identity of the cell in which the channel resource has been assigned. For the call-setup (Assignment) case, the BSC sends the cell identity to the MSC only if the channel resource was allocated in a cell different from the cell in which the call setup was originated (i.e., assignment to another cell).

Also at inter-BSC handover and at sending a Handover Required message, there is a need send the correct target cell identity(ies). At inter-BSC handover between twin cells and at sending the A-interface Handover Required message to the MSC, there is a need to check the MS's RPLMN and include an external cell identity that belongs to the MS's RPLMN. If for example a PLMN A MS has been allocated a TCH channel in a PLMN B twin cell, the locating process running related to the PLMN B twin cell can come up with a handover candidate list which includes a BSC-external PLMN B twin cell. For that case, the BSC includes in the Handover Required message the cell identity of the corresponding external PLMN A twin cell since the MS belongs to the PLMN A.

For the case of A-interface over internet protocol (IP) and at sending of the A-interface Internal Handover Required message toward the MSC, the BSC does the same check and if necessary replaces the conventional cell identity with the identity of the twin cell.

PS Core Network Transparency

The SGSN can be unaware of the existence of twin cells and PDCH sharing between twin cells, thereby minimizing the impact on the PS core network. On the Gb-interface, all packet session flows are sent on logical channels that are defined for each cell. In order to make the TRX sharing transparent also for the SGSN node, the same logical channel related to the SGSN of the RPLMN are used even if a TBF has been allocated on PDCH channels for the other PLMN.

Intra/Inter-BSC Handover between Twin Cells

Each PLMN is configured separately in the BSC from a handover perspective. Thus, the BSC is configured for handover relations (i.e., channel resource allocations in step 207 in FIG. 2) from twin cells in a PLMN A to other twin cells in the PLMN A. For a PLMN A cell, the configuration of the neighboring BCCH allocation (BA) list in active mode advantageously includes the measurement frequencies for PLMN A twin cells (both internal and external cells). The same applies for a PLMN B and PLMN B cells.

During the handover preparation phase, the allocation of TCH channel in the target cell is done as described above under the heading Allocation of TCHs for CS Services.

Intra/Inter-BSC Handover between a Twin Cell and a Single Cell

In typical wireless communication networks, it is likely that there are areas in which twin cells border on "single" cells, i.e., cells that do not have twins. For example, such areas are likely to occur during the migration from completely separate PLMN networks without TRX sharing to PLMN networks with TRX sharing.

The configuration of handover relations and neighboring BA list in active mode is done as described above in connection with allocation of SDCCH resources for CS services, but some special cases require additional functionality in the BSC.

Figure 4:
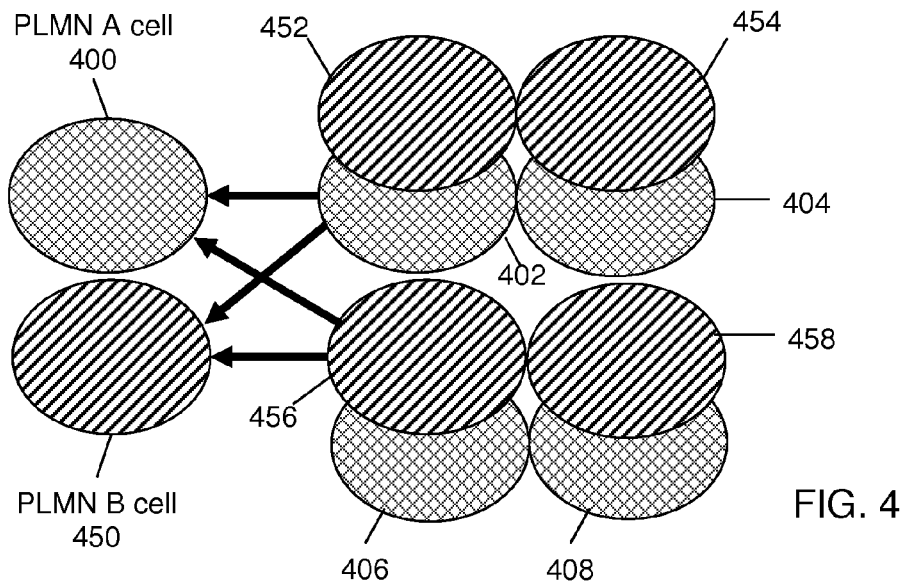
FIG. 4 illustrates handover in cellular radio communication networks having shared base station systems.

FIG. 4 illustrates twin cells bordering single cells and handovers from twin cells to single cells. Cells in two different PLMNs A, B are illustrated by cross-hatching for PLMN A cells 400, 402, 404, 406, 408 and by diagonal hatching for PLMN B cells 450, 452, 454, 456, 458. Cells 400, 450 are single cells, and cells 402, 452, and 404, 454, and 406, 456, and 408, 458 are twin cells.

The arrows illustrate four potential handovers of an MS registered in the PLMN A from the PLMN A twin cell 402 to the single cells 400, 450 and from the PLMN B twin cell 456 to the single cells 400, 450. An equivalent four cases exist for an MS registered in PLMN B. It will be understood that for the purposes of this example, all PLMN A twin cells can be considered to be the same, and all PLMN B twin cells can be considered to be the same.

Case 1: The MS has been allocated channel resources in the PLMN A twin cell 402 and is handed over to the PLMN A single cell 400. In this case, the BSC is configured to carry out handover conventionally according to the requirements of the communication system.

Case 2: The MS has been allocated channel resources in the PLMN A twin cell 402 and is handed over to the PLMN B single cell 450. In this case, the BSC is configured to carry out inter-PLMN handover conventionally, if that is possible.

Case 3: The MS has been allocated channel resources in the PLMN B twin cell 456 and is handed over to the PLMN B single cell 450. It will be recalled that the MS is registered in the PLMN A and the PLMN B twin cell 456 is treated as a PLMN A cell. As in case 2, in case 3, the BSC is configured to carry out inter-PLMN handover conventionally, if that is possible.

Case 4: The MS has been allocated channel resources in the PLMN B twin cell 456 and is handed over to the PLMN A single cell 400. In this case, the BSC is modified to include the PLMN A single cell 400 as a valid handover relation for the PLMN B twin cell 456, thereby providing the PLMN A single cell 400 in the active BA list of the PLMN B twin cell 456.

In addition, the MS in this example handles both PLMNs as valid network color code (NCC) in terms of measurement reporting. NCCs are part of a Cell Description information element in RRC messaging described in Section 10.5.2.2, for example, of 3GPP TS 44.018 cited above, and an NCC Permitted information element is part of a System Information Type 6 message described in Section 9.1.40, for example, of 3GPP TS 44.018. It will be appreciated that this behavior is permitted only for PLMN A MSs, not for PLMN B MSs (as that would result in inter-PLMN handover). This can be achieved by configuring the BSC to send different NCC Permitted values to the PLMN A and PLMN B MSs. For example, the NCC Permitted information element sent to a PLMN A MS can include the NCC for both PLMNs A and B, and the NCC Permitted value sent to a PLMN B MS can include only the NCC for the PLMN B.

Accordingly, for handling channel resource allocations due to handovers between bordering single and twin cells, a BSC is configured such that its twin cells have respective handover relationships and BA lists that include neighboring twin cells from their own PLMN and single cells from both their own PLMN and other PLMN(s). In addition, received-signal measurement reporting by MSs of the different PLMNs can be optimized, and inter-PLMN handover can be precluded by configuring the BSC with the functionalities described here. For example, if a TCH has been allocated in a twin cell of an MS's RPLMN and if there are defined neighboring single cells from the RPLMN and another PLMN, then the NCC-permitted parameter in the System Information Type 6 message described in 3GPP TS 44.018 includes the NCC only for the RPLMN. If a TCH has been allocated in a twin cell of a PLMN other than the RPLMN and if there are defined neighboring single PLMN cells from both the RPLMN and the other PLMN, the NCC Permitted value in the System Information Type 6 message includes an NCC for both the RPLMN and the other PLMN. If a TCH has been allocated in a twin cell of another PLMN and if the handover candidate list includes single cells of that other PLMN as handover candidate(s), then those handover candidate(s) are ignored.

Figure 5:
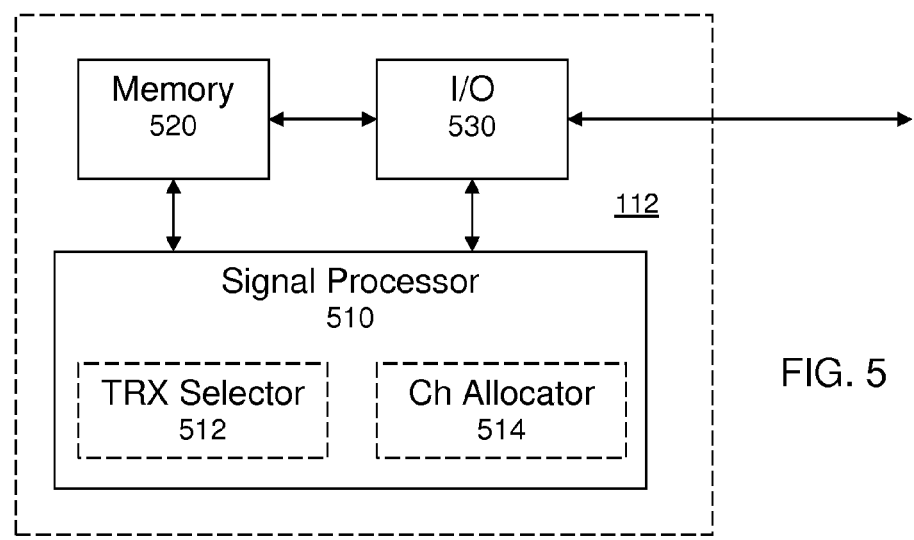
FIG. 5 is a block diagram of a base station controller for a shared base station system.

FIG. 5 is a functional block diagram of a BSC 112 that can configured to implement the resource allocation methods described above in a shared BSS 110. The BSC 112 includes a signal processor 510, which is advantageously a programmed electronic processor circuit or equivalent logic circuit, that exchanges signals with and controls a memory 520 and an input/output (I/O) interface 530. The devices shown in FIG. 5 cooperate in generating and receiving messages exchanged on the interfaces between the BSC 112 and the RBS 114, MSCs 122A, 122B, 122C, 122D, and SGSNs 142A, 142B, 142C, and 142D. The processor 510 is suitably programmed to carry out the channel resource allocation methods described above, and so the processor can be considered as including a TRX selector 512 and a channel allocator 514. The memory 520 can store the information associated with twin-cell and single-cell configuration information and MS contexts needed for carrying out the methods described above.

Among other things, this invention provides a new way of sharing of TRX resources between PLMNs that share a BSS. TRX sharing can be done for circuit-switched services using TCHs and/or SDCCHs, and/or for well packet-switched services using PDCHs. TRX sharing in accordance with this invention can have minimal impact on existing radio networks and core networks, with no change to the radio network approaches already used.

Sharing of TRX resources between twin cells of two or more PLMNs can be done at the moment of channel allocation by modifying a conventional channel allocation algorithm such that it searches for channel resources in all relevant twin cell, taking into account service requirements and other criteria that impact the channel allocation. Examples of such service requirements and other criteria include MS-priority-related parameters and other information received from the core network. Only if a twin cell can better fulfill the service requirements and criteria is a channel resource shared from the twin cell of a PLMN other than an RPLMN; otherwise, a channel resource is allocated from the RPLMN. Other criteria or preferences can also be used for the channel allocation decision, depending on customer preferences. It is anticipated that several parameters are analyzed and taken into account when deciding if a channel from a twin cell of a different PLMN should be allocated or not.

It will be appreciated that the methods and devices described above can be combined and re-arranged in a variety of equivalent ways, and that the methods can be performed by one or more suitably programmed or configured digital signal processors and other known electronic circuits (e.g., discrete logic gates interconnected to perform a specialized function, or application-specific integrated circuits). Many aspects of this invention are described in terms of sequences of actions that can be performed by, for example, elements of a programmable computer system. UEs embodying this invention include, for example, mobile telephones, pagers, headsets, laptop computers and other mobile terminals, and the like. Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

It will be appreciated that procedures described above are carried out repetitively as necessary, for example, to respond to the time-varying nature of communication channels between transmitters and receivers. In addition, it will be understood that the methods and apparatus described here can be implemented in various system nodes.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless devices implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a storage medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

What is claimed is:

1. A method in a base station controller of allocating a radio channel resource to a mobile station, comprising:
configuring the base station controller to be aware of twin cells corresponding to respective first and second radio transceivers of a pool of radio transceivers shared among a plurality of wireless telecommunication networks, the first radio transceiver being for a first radio base station belonging to a first one of the plurality of wireless telecommunication networks, the second radio transceiver being for a second radio base station belonging to a second one of the plurality of wireless telecommunication networks, the twin cells having the same geographic area, each radio transceiver in the pool being able to operate in each of the plurality of wireless telecommunication networks, and the base station controller belonging to the first one of the plurality of wireless telecommunication networks;
determining whether a request for a channel resource is directed to a cell that has a respective twin cell; and
when the request for the channel resource is directed to a cell that has a configured twin cell, allocating a channel resource from either the cell or the respective twin cell irrespective of wireless communication network to which the allocated cell belongs, and storing a registered network of the mobile station.

2. The method of claim 1, wherein configuring the base station controller to be aware of twin cells includes storing a list of twin cells in the base station controller.

3. The method of claim 1, wherein configuring the base station controller to be aware of twin cells includes searching for cells in the first and second wireless communication networks that use the same antenna and a common broadcast control channel configuration.

4. The method of claim 1, wherein the channel resource is allocated based on at least one of a service requirement of the mobile station, loads on the cell and the respective twin cell, and a priority of the mobile station.

5. The method of claim 1, wherein allocating the channel resource includes preferentially allocating a channel resource from the wireless communication network in which the mobile station is registered.

6. The method of claim 1, wherein the channel resource includes at least one of a traffic channel, a stand-alone dedicated control channel, and a packet data channel.

7. The method of claim 1, further comprising configuring the base station controller to be aware of at least one single cell belonging to at least one of the first and second networks, wherein determining whether a request for a channel resource is directed to a twin cell includes determining whether the request is directed to a handover from a twin cell to the at least one single cell, and allocating a channel resource includes, if the request is directed to the handover, allocating a channel resource from the single cell if the single cell and the twin cell belong to the same wireless communication network.

8. An apparatus in a base station controller for allocating a radio channel resource to a mobile station, comprising:
an electronic processor configured to be aware of twin cells corresponding to respective first and second radio transceivers of a pool of radio transceivers shared among a plurality of wireless telecommunication networks, the first radio transceiver being for a first radio base station belonging to a first one of the plurality of wireless telecommunication networks, the second radio transceiver being for a second radio base station belonging to a second one of the plurality of wireless telecommunication networks, the twin cells having substantially the same geographic coverage area, each radio transceiver in the pool being able to operate in each of the plurality of wireless telecommunication networks, and the base station controller belonging to the first one of the plurality of wireless telecommunication networks; to determine whether a request for a channel resource is directed to a cell that has a respective twin cell; and to allocate, when the request for the channel resource is directed to a cell that has a configured twin cell, a channel resource from either the cell or the respective twin cells irrespective of wireless communication network to which the allocated cell belongs; and a memory configured for storing a registered network of the mobile station.

9. The apparatus of claim 8, wherein the processor is configured to be aware of twin cells by at least storing a list of twin cells in the base station controller.

10. The apparatus of claim 8, wherein the processor is configured to be aware of twin cells by at least searching for cells in the first and second wireless communication networks that use the same antenna and a common broadcast control channel configuration.

11. The apparatus of claim 8, wherein the channel resource is allocated based on at least one of a service requirement of the mobile station, loads on the cell and the respective twin cell, and a priority of the mobile station.

12. The apparatus of claim 8, wherein allocating the channel resource includes preferentially allocating a channel resource from the wireless communication network in which the mobile station is registered.

13. The apparatus of claim 8, wherein the channel resource includes at least one of a traffic channel, a stand-alone dedicated control channel, and a packet data channel.

14. The apparatus of claim 8, wherein the processor is further configured to be aware of at least one single cell belonging to at least one of the first and second networks; to determine whether a request for a channel resource is directed to a twin cell by at least determining whether the request is directed to a handover from a twin cell to the at least one single cell; and to allocate a channel resource by at least, if the request is directed to the handover, allocating a channel resource from the single cell if the single cell and the twin cell belong to the same wireless communication network.

15. A computer-readable medium having stored instructions that, when executed by a computer, cause the computer to carry out a method in a base station controller of allocating a radio channel resource to a mobile station, wherein the method comprises:

configuring the base station controller to be aware of twin cells corresponding to respective first and second radio transceivers of a pool of radio transceivers shared among a plurality of wireless telecommunication networks, the first radio transceiver being for a first radio base station belonging to a first one of the plurality of wireless telecommunication networks, the second radio transceiver being for a second radio base station belonging to a second one of the plurality of wireless telecommunication networks, the twin cells having the same geographic area, each radio transceiver in the pool being able to operate in each of the plurality of wireless telecommunication networks, and the base station controller belonging to the first one of the plurality of wireless telecommunication networks;

determining whether a request for a channel resource is directed to a cell that has a respective twin cell; and when the request for the channel resource is directed to a cell that has a configured twin cell, allocating a channel resource from either the cell or the respective twin cells irrespective of wireless communication network to which the allocated cell belongs, and storing a registered network of the mobile station.

16. The medium of claim 15, wherein configuring the base station controller to be aware of twin cells includes storing a list of twin cells in the base station controller.

17. The medium of claim 15, wherein configuring the base station controller to be aware of twin cells includes searching for cells in the first and second wireless communication networks that use the same antenna and a common broadcast control channel configuration.

18. The medium of claim 15, wherein the channel resource is allocated based on at least one of a service requirement of the mobile station, loads on the cell and the respective twin cell, and a priority of the mobile station.

19. The medium of claim 15, wherein allocating the channel resource includes preferentially allocating a channel resource from the wireless communication network in which the mobile station is registered.

20. The medium of claim 15, wherein the channel resource includes at least one of a traffic channel, a stand-alone dedicated control channel, and a packet data channel.

21. The medium of claim 15, wherein the method further comprises configuring the base station controller to be aware of at least one single cell belonging to at least one of the first and second networks; determining whether a request for a channel resource is directed to a twin cell includes determining whether the request is directed to a handover from a twin cell to the at least one single cell; and allocating a channel resource includes, if the request is directed to the handover, allocating a channel resource from the single cell if the single cell and the twin cell belong to the same wireless communication network.

* * * * *